US010011716B2

(12) United States Patent
Ko et al.

(10) Patent No.: US 10,011,716 B2
(45) Date of Patent: *Jul. 3, 2018

(54) COPOLYCARBONATE COMPOSITION AND ARTICLE CONTAINING THE SAME

(71) Applicant: LG CHEM, LTD., Seoul (KR)

(72) Inventors: Un Ko, Daejeon (KR); Hyong Min Bahn, Daejeon (KR); Young Young Hwang, Daejeon (KR); Jung Jun Park, Daejeon (KR); Moo Ho Hong, Daejeon (KR); Ki Jae Lee, Daejeon (KR); Byoung Kyu Chun, Daejeon (KR); Young Wook Son, Daejeon (KR); Tae Yun Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/039,341

(22) PCT Filed: Dec. 3, 2015

(86) PCT No.: PCT/KR2015/013159
§ 371 (c)(1),
(2) Date: May 25, 2016

(87) PCT Pub. No.: WO2016/089137
PCT Pub. Date: Jun. 9, 2016

(65) Prior Publication Data
US 2017/0158852 A1 Jun. 8, 2017

(30) Foreign Application Priority Data

Dec. 4, 2014 (KR) .................. 10-2014-0173005
Nov. 13, 2015 (KR) .................. 10-2015-0159987

(51) Int. Cl.
| | | |
|---|---|---|
| *C08L 69/00* | (2006.01) | |
| *C08L 83/10* | (2006.01) | |
| *C08K 5/3475* | (2006.01) | |
| *C08G 64/18* | (2006.01) | |
| *C08G 64/38* | (2006.01) | |
| *C08G 77/448* | (2006.01) | |
| *C08J 5/00* | (2006.01) | |
| *C08G 64/16* | (2006.01) | |
| *C08G 64/06* | (2006.01) | |
| *C08G 64/30* | (2006.01) | |
| *C08G 64/08* | (2006.01) | |
| *C08L 83/04* | (2006.01) | |
| *C08G 64/24* | (2006.01) | |
| *C08K 5/00* | (2006.01) | |
| *C08G 64/22* | (2006.01) | |
| *C08G 77/14* | (2006.01) | |
| *C08L 83/06* | (2006.01) | |

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/448* (2013.01); *C08J 5/00* (2013.01); *C08K 5/005* (2013.01); *C08K 5/3475* (2013.01); *C08L 69/005* (2013.01); *C08L 83/04* (2013.01); *C08L 83/06* (2013.01); *C08L 83/10* (2013.01); *C08L 2201/08* (2013.01); *C08L 2201/10* (2013.01); *C08L 2205/02* (2013.01); *C08L 2205/025* (2013.01); *C08L 2205/05* (2013.01); *C08L 2205/06* (2013.01)

(58) Field of Classification Search
CPC .............................. C08G 64/186; C08L 83/10
See application file for complete search history.

(56) References Cited

U.S. PATENT DOCUMENTS

| | | | | |
|---|---|---|---|---|
| 3,819,744 A | | 6/1974 | Buechner et al. | |
| 4,600,632 A | * | 7/1986 | Paul ..................... | C08G 64/186 428/220 |
| 4,732,949 A | * | 3/1988 | Paul ..................... | C08G 77/448 525/464 |
| 5,137,949 A | * | 8/1992 | Paul ..................... | C08K 5/3475 524/87 |
| 5,324,454 A | | 6/1994 | Takata et al. | |

(Continued)

FOREIGN PATENT DOCUMENTS

| | | |
|---|---|---|
| CN | 101124282 A | 2/2008 |
| CN | 101585961 A | 11/2009 |

(Continued)

OTHER PUBLICATIONS

Machine translated English language equivalent of JP 2012-153824 (Aug. 2012, 24 pages).*

(Continued)

*Primary Examiner* — Brieann R Johnston

(74) *Attorney, Agent, or Firm* — Dentons US LLP

(57) ABSTRACT

The present invention relates to a copolycarbonate resin composition comprising a copolycarbonate in which a specific siloxane compound is introduced in a main chain of the polycarbonate, and a UV stabilizer. Since the present copolycarbonate resin composition has excellent weather resistance, the article prepared by using this composition exhibits less deteriorated surface quality and physical properties caused by ultraviolet rays or the like when exposed to the outside.

12 Claims, No Drawings

(56) References Cited

U.S. PATENT DOCUMENTS

| | | |
|---|---|---|
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | König et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 * | 2/2016 | Park .................. C08G 64/1666 |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | DeRudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0271009 A1 | 10/2012 | Higaki et al. |
| 2012/0283393 A1 | 11/2012 | Ishikawa |
| 2013/0035441 A1 | 2/2013 | De Brouwer et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0106208 A1 | 4/2014 | Ishikawa et al. |
| 2014/0148559 A1 | 5/2014 | Kim et al. |
| 2014/0179843 A1 | 6/2014 | Van Der Mee et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | van der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1 | 11/2015 | Bahn et al. |
| 2015/0344623 A1 | 12/2015 | Park et al. |
| 2015/0368484 A1 | 12/2015 | Shihaku et al. |
| 2016/0002410 A1 | 1/2016 | Iyer et al. |
| 2016/0017102 A1 | 1/2016 | Yamada |
| 2016/0122477 A1 | 5/2016 | Rhee et al. |
| 2016/0251481 A1 | 9/2016 | Hwang et al. |
| 2016/0297926 A1 | 10/2016 | Hwang et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012153824 A * | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |

(56) References Cited

FOREIGN PATENT DOCUMENTS

| | | |
|---|---|---|
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 10-2015-0119823 A | 10/2015 |
| KR | 10-1563269 B1 | 10/2015 |
| KR | 2015-0134457 A | 12/2015 |
| TW | 201241043 A | 10/2012 |
| WO | 2012060516 A1 | 5/2012 |
| WO | 2013/051557 A1 | 4/2013 |
| WO | 2013-058214 A1 | 4/2013 |
| WO | 2013/073709 A1 | 5/2013 |
| WO | 2013/100606 A1 | 7/2013 |
| WO | 2013-115538 A1 | 8/2013 |
| WO | 2013/175445 A2 | 11/2013 |
| WO | 2013/175455 A1 | 11/2013 |
| WO | 2014042252 A1 | 3/2014 |
| WO | 2014/058033 A1 | 4/2014 |
| WO | 2014/119827 A1 | 8/2014 |
| WO | 2014/139110 A1 | 9/2014 |
| WO | 2014/144673 A1 | 9/2014 |
| WO | 2015/011669 A2 | 1/2015 |
| WO | 2015/015445 A2 | 2/2015 |
| WO | 2015/087595 A1 | 6/2015 |

OTHER PUBLICATIONS

Hwang, et al.: "Production of impact strength and fluidity-improved polycarbonate and composition comprising same", Chemical Abstract for US2016/0251481A1, Mar. 24, 2016.

Chemical Abstract registry No. 163617-00-3, Jun. 8, 1995.

* cited by examiner

COPOLYCARBONATE COMPOSITION AND ARTICLE CONTAINING THE SAME

CROSS-REFERENCE TO RELATED APPLICATION(S)

This application is a National Stage Application of International Application No. PCT/KR2015/013159, filed Dec. 3, 2015, and claims the benefit of Korean Patent Application No. 10-2015-0159987, filed Nov. 13, 2015, and Korean Patent Application No. 10-2014-0173005, filed Dec. 4, 2014, the contents of which are incorporated herein by reference in their entirety for all purposes as if fully set forth below.

TECHNICAL FIELD

The present invention relates to a copolycarbonate composition having excellent weather resistance and to an article comprising the same.

BACKGROUND OF ART

Polycarbonate resins are prepared by condensation-polymerization of an aromatic diol such as bisphenol A with a carbonate precursor such as phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerizing two or more aromatic diol compounds having different structures from each other and introducing units having different structures in a main chain of the polycarbonate.

Products made of polycarbonate resins may have deteriorated surface quality and physical properties caused by ultraviolet rays or the like when exposed to the outside. Thus, the weather resistance that prevents the physical properties of the polycarbonate resin from being decreased by ultraviolet rays or the like is required.

Given the above circumstances, the present inventors have found that a copolycarbonate resin composition comprising a copolycarbonate in which a specific siloxane compound is introduced in a main chain of the polycarbonate and a UV stabilizer as described below has excellent physical properties such as weather resistance, and completed the present invention.

DETAILED DESCRIPTION OF THE INVENTION

Technical Problem

It is an object of the present invention to provide a copolycarbonate composition having excellent weather resistance.

It is another object of the present invention to provide an article comprising the above-mentioned copolycarbonate composition.

Technical Solution

In order to achieve the above objects, the present invention provides a copolycarbonate composition which comprises (a) a copolycarbonate which comprises an aromatic polycarbonate-based first repeating unit; and one or more aromatic polycarbonate-based second repeating units having siloxane bonds, and (b) a UV stabilizer, wherein the copolycarbonate composition has ΔYI of not more than 7 as measured according to the following Equation 1:

ΔYI=YI(500 hours)−YI(0 hour)  [Equation 1]

in the Equation 1,

YI (0 hour) is YI (Yellow Index) measured in accordance with ASTM D1925 with respect to the copolycarbonate composition, and YI (500 hours) is YI (Yellow Index) measured in accordance with ASTM 01925 with respect to the copolycarbonate composition, after irradiating ultraviolet rays of 340 nm to the composition with a light quantity of 0.55 w/m² at 60° C. for 500 hours in accordance with ASTM D4329.

When preparing a product using a copolycarbonate, the product may have deteriorated surface quality and physical properties caused by ultraviolet rays or the like when exposed to the outside. Therefore, in order to minimize deterioration of the physical properties caused by ultraviolet rays or the like, a UV stabilizer is used with the copolycarbonate in the present invention.

Hereinafter, the present invention will be described in detail.

Copolycarbonate

The copolycarbonate according to the present invention comprises an aromatic polycarbonate-based first repeating unit; and one or more aromatic polycarbonate-based second repeating units having siloxane bonds.

The above aromatic polycarbonate-based first repeating unit is formed by reacting an aromatic diol compound and a carbonate precursor, and it is more preferably represented by the following Chemical Formula 1:

[Chemical Formula 1]

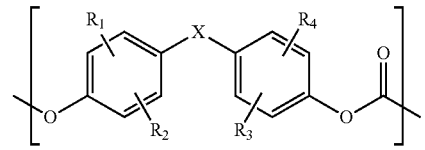

in the Chemical Formula 1, $R_1$, $R_2$, $R_3$ and $R_4$ are each independently hydrogen, $C_{1-10}$ alkyl, $C_{1-10}$ alkoxy, or halogen, and X is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, in the Chemical Formula 1, $R_1$, $R_2$, $R_3$ and $R_4$ are each independently hydrogen, methyl, chloro, or bromo.

Also, X is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, X is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl) propyl]polydimethylsiloxane.

As used herein, 'derived from aromatic diol compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

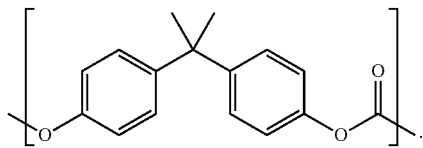

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

The above-described one or more aromatic polycarbonate-based second repeating units having siloxane bonds are formed by reacting one or more siloxane compounds and a carbonate precursor, and it comprises preferably a repeating unit represented by the following Chemical Formula 2 and a repeating unit represented by the following Chemical Formula 3:

[Chemical Formula 2]

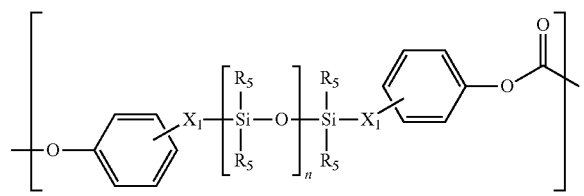

in the Chemical Formula 2, each of $X_1$ is independently $C_{1-10}$ alkylene, each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n is an integer of 10 to 200,

[Chemical Formula 3]

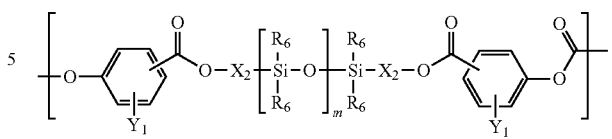

in the Chemical Formula 3, each of $X_2$ is independently $C_{1-10}$ alkylene, each of $Y_1$ is independently hydrogen, $C_{1-6}$ alkyl, halogen, hydroxy, $C_{1-6}$ alkoxy, or $C_{6-20}$ aryl, each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and m is an integer of 10 to 200.

In Chemical Formula 2, each of $X_1$ is independently preferably $C_{2-10}$ alkylene, more preferably $C_{2-4}$ alkylene and most preferably propane-1,3-diyl.

Also, preferably, each of $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. In addition, each of $R_5$ is independently preferably $C_{1-10}$ alkyl, more preferably $C_{1-6}$ alkyl, more preferably $C_{1-3}$ alkyl and most preferably methyl.

Further, preferably, n is an integer of not less than 10, not less than 15, not less than 20, not less than 25, not less than 30, not less than 31, or not less than 32; and not more than 50, not more than 45, not more than 40, not more than 39, not more than 38, or not more than 37.

In Chemical Formula 3, each of $X_2$ is independently preferably $C_{2-10}$ alkylene, more preferably $C_{2-6}$ alkylene and most preferably isobutylene.

Further, preferably, $Y_1$ is hydrogen.

Further, preferably, each of $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each of $R_6$ is independently $C_{1-10}$ alkyl, more preferably $C_{1-6}$ alkyl, more preferably $C_{1-3}$ alkyl, and most preferably methyl.

Preferably, m is not less than 40, not less than 45, not less than 50, not less than 55, not less than 56, not less than 57, or not less than 58; and not more than 80, not more than 75, not more than 70, not more than 65, not more than 64, not more than 63, or not more than 62.

The repeating unit represented by Chemical Formula 2 and the repeating unit represented by Chemical Formula 3 are derived from a siloxane compound represented by the following Chemical Formula 2-1 and a siloxane compound represented by the following Chemical Formula 3-1, respectively:

[Chemical Formula 2-1]

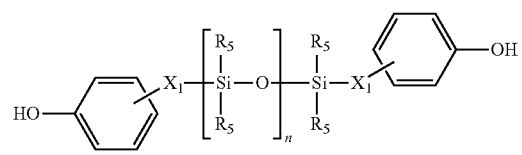

in the Chemical Formula 2-1, $X_1$, $R_5$ and n are the same as previously defined.

[Chemical Formula 3-1]

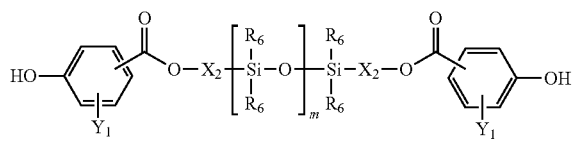

in the Chemical Formula 3-1, $X_2$, $Y_1$, $R_6$ and m are the same as previously defined.

As used herein, 'derived from a siloxane compound' means that a hydroxy group of the respective siloxane compound and a carbonate precursor are reacted to form the repeating unit represented by Chemical Formula 2 and the repeating unit represented by the Chemical Formula 3. Further, the carbonate precursors that can be used for the formation of the repeating units represented by Chemical Formulae 2 and 3 are the same as those described for the carbonate precursor that can be used for the formation of the repeating unit represented by Chemical Formula 1 described above.

The methods for preparing the siloxane compound represented by Chemical Formula 2-1 and the siloxane compound represented by Chemical Formula 3-1 are represented by the following Reaction Schemes 1 and 2, respectively:

[Reaction Scheme 1]

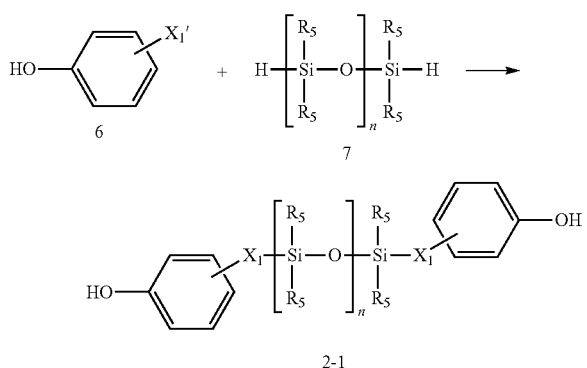

in the Reaction Scheme 1,
$X_1'$ is $C_{2-10}$ alkenyl, and
$X_1$, $R_5$ and n are the same as previously defined.

[Reaction Scheme 2]

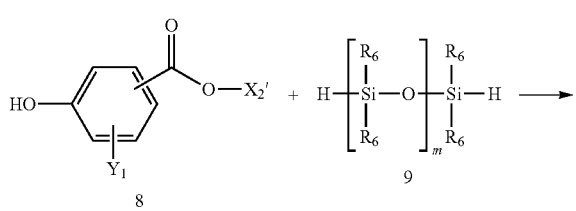

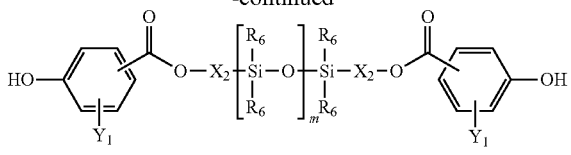

in the Reaction Scheme 2,
$X_2'$ is $C_{2-10}$ alkenyl, and
$X_2$, $Y_1$, $R_6$ and m are the same as previously defined.

In Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2$ (COD), $PtCl_2$(benzonitrile)$_2$ and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by Chemical Formulae 7 or 9.

Further, the above reaction temperature is preferably 80 to 100° C. Further, the above reaction time is preferably 1 to 5 hours.

In addition, the compounds represented by Chemical Formulae 7 or 9 may be prepared by reacting an organodisiloxane and an organocyclosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocyclosiloxane may include, for example, organocyclotetrasiloxane. As one example thereof, octamethylcyclotetrasiloxane and octaphenylcyclotetrasiloxane or the like can be included.

The above organodisiloxane can be used in an amount of not less than 0.1 parts by weight, or not less than 2 parts by weight; and not more than 10 parts by weight, or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than parts by weight or not more than 3 parts by weight, based on 100 parts by weight of the organocyclosiloxane.

The weight ratio between the repeating unit represented by Chemical Formula 2 and the repeating unit represented by Chemical Formula 3 may be from 1:99 to 99:1. Preferably, the weight ratio is from 3:97 to 97:3, from 5:95 to 95:5, from 10:90 to 90:10, or from 15:85 to 85:15, and more preferably from 20:80 to 80:20. The weight ratio of the above repeating units corresponds to the weight ratio of siloxane compounds, for example the siloxane compound represented by Chemical Formula 2-1 and the siloxane compound represented by Chemical Formula 3-1.

Preferably, the repeating unit represented by Chemical Formula 2 is represented by the following Chemical Formula 2-2:

[Chemical Formula 2-2]

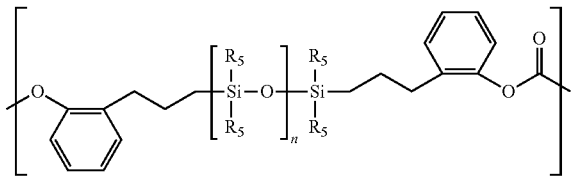

in the Chemical Formula 2-2, $R_5$ and n are the same as previously defined. Preferably, $R_5$ is methyl.

Also, preferably, the repeating unit represented by Chemical Formula 3 is represented by the following Chemical Formula 3-2:

[Chemical Formula 3-2]

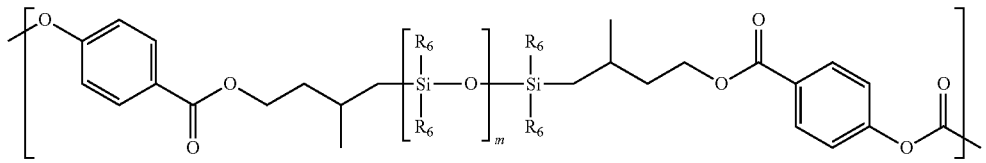

in the Chemical Formula 3-2, $R_6$ and m are the same as previously defined. Preferably, $R_6$ is methyl.

Further, the copolycarbonate according to the present invention comprises all of the repeating unit represented by Chemical Formula 1-1, the repeating unit represented by Chemical Formula 2-2, and the repeating unit represented by Chemical Formula 3-2.

The copolycarbonate according to the present invention may be prepared by a preparation method comprising a step of polymerizing the aromatic diol compound, the carbonate precursor and one or more siloxane compounds. The aromatic diol compound, the carbonate precursor and one or more siloxane compounds are the same as previously described.

During the polymerization, one or more siloxane compounds may be used in an amount of not less than 0.1% by weight, not less than 0.5% by weight, not less than 1% by weight, or not less than 1.5% by weight; and not more than 20% by weight, not more than 10% by weight, not more than 7% by weight, not more than 5% by weight, not more than 4% by weight, not more than 3% by weight or not more than 2% by weight, based on 100% by weight in total of the aromatic diol compound, the carbonate precursor and the one or more siloxane compounds. Also, the above aromatic diol compound may be used in an amount of not less than 40% by weight, not less than 50% by weight, or not less than 55% by weight; and not more than 80% by weight, not more than 70% by weight, or not more than 65% by weight, based on 100% by weight in total of the aromatic diol compound, the carbonate precursor and one or more siloxane compounds. The above carbonate precursor may be used in an amount of not less than 10% by weight, not less than 20% by weight, or not less than 30% by weight; and not more than 60% by weight, not more than 50% by weight, or not more than 40 by weight, based on 100% by weight in total of the aromatic diol compound, the carbonate precursor and one or more siloxane compounds.

Further, as the polymerization method, an interfacial polymerization method may be used as one example. In this case, there is an advantage in that the polymerization reaction can be made at low temperature and atmospheric pressure, and it is easy to control the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight may be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene may be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C. and the reaction time is preferably from 10 minutes to 5 hours. Further, during the interfacial polymerization reaction, pH is preferably maintained at 9 or more, or 11 or more.

In addition, the interfacial polymerization may be conducted by further including a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is, for example, one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; and in an amount of not more than 10 parts by weight, not more than 6 parts by weight, or not more than 5 parts by weight, based on 100 parts by weight of the aromatic diol compound. Within this range, the required molecular weight may be obtained.

Further, preferably, the molar ratio of the aromatic polycarbonate-based first repeating unit and one or more aromatic polycarbonate-based second repeating units having siloxane bonds is 1:0.001-0.006 and/or the weight ratio thereof is 1:0.01-0.03.

Further, preferably, the copolycarbonate has a weight average molecular weight of 1,000 to 100,000 g/mol and preferably 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Also, the above weight average molecular weight (g/mol) is not more than 34,000, not more than 33,000, or not more than 32,000.

UV Stabilizer

The copolycarbonate composition according to the present invention comprises a UV stabilizer in order to improve physical properties, particularly, weather resistance, of the above-mentioned copolycarbonate.

The UV stabilizer used in the present invention is not particularly limited as long as it can improve the weather resistance of the copolycarbonate. Preferably, the UV stabilizer has a benzotriazole structure, and more preferably, it is represented by the following Chemical Formula 4:

[Chemical Formula 4]

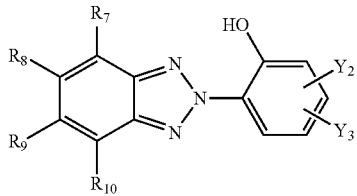

in the Chemical Formula 4, $R_7$, $R_8$, $R_9$ and $R_{10}$ are each independently hydrogen, hydroxy, halogen, or hydrocarbon group having 1 to 12 carbon atoms, $Y_2$ and $Y_3$ are each independently hydrogen; hydrocarbon group having 1 to 40 carbon atoms, wherein the hydrocarbon group may further comprise a nitrogen atom or an oxygen atom.

Specifically, the UV stabilizer used herein may include one or more selected from the group consisting of 2-(5-methyl-2-hydroxyphenyl)benzotriazole (Tinuvin® P), 2-[2-hydroxy-3,5-bis(α,α-dimethylbenzyl)phenyl]-2H-benzotriazole (Tinuvin® 234), 2-(3,5-di-t-butyl-2-hydroxyphenyl)benzotriazole (Tinuvin® 320), 2-(3-t-butyl-5-methyl-2-hydroxyphenyl)-5-chlorobenzotriazole (Tinuvin® 326), 2-(3',5'-di-t-butyl-2'-hydroxyphenyl)-5-chlorobenzotriazole (Tinuvin® 327), 2-(3,5-di-t-amyl-2-hydroxyphenyl)benzotriazole (Tinuvin® 328) and 2-(2-hydroxy-5-t-octylphenyl) (Tinuvin® 329).

Copolycarbonate Composition

The copolycarbonate composition according to the present invention comprises the above-mentioned copolycarbonate and UV stabilizer.

Meanwhile, in the present invention, the 'weather resistance' is evaluated according to the Equation 1. The Equation 1 refers to the difference between YI (Yellow Index, 0 hour) measured in accordance with ASTM D1925 with respect to the copolycarbonate composition and YI (Yellow Index, 500 hours) measured in accordance with ASTM 01925 with respect to the copolycarbonate composition, after irradiating ultraviolet rays under specific conditions (temperature: 60° C., UV wavelength: 340 nm, light quantity: 0.55 w/m², irradiation time: 500 hours) in accordance with ASTM D4329. Therefore, a smaller value of YI means less deformation, i.e., more excellent weather resistance. The UV irrdiation can be performed by using an apparatus commonly known in the art. As one example, QUV-A Accelerated Weathering Test chamber (manufactured by Q-LAB Corporation) can be used.

Preferably, in the Equation 1, $\Delta YI$ is not more than 6.5, not more than 6.0, not more than 5.5, not more than 5.0, not more than 4.5, not more than 4.0, not more than 3.5, or not more than 3.0. Also, a smaller value of $\Delta YI$ means excellent weather resistance, and the lower limit thereof is 0, but for example, $\Delta YI$ may be not less than 0.1, not less than 0.2, not less than 0.3, not less than 0.4, not less than 0.5, not less than 0.6, not less than 0.7, not less than 0.8, not less than 0.9, or not less than 1.0.

Further, preferably, the copolycarbonate composition has a weight average molecular weight of 1,000 to 100,000 g/mol, more preferably 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

Further, preferably, the above copolycarbonate composition has impact strength at room temperature of 700 to 1000 J/m as measured at 23° C. in accordance with ASTM D256 (⅛ inch, Notched Izod). More preferably, the above impact strength at room temperature (J/m) is not less than 710, not less than 720, not less than 730, not less than 740, not less than 750, or not less than 760. The above impact strength at room temperature (J/m) is more excellent when the value is higher, and it is not limited to any upper limit. However, as one example, it is not more than 850, not more than 840, not more than 830, not more than 820, not more than 810, not more than 800, or not more than 790.

Further, preferably, the above copolycarbonate composition has impact strength at low temperature of 600 to 800 J/m as measured at −30° C. in accordance with ASTM D256 (⅛ inch, Notched Izod). More preferably, the above impact strength at low temperature (J/m) is not less than 610, not less than 620, not less than 630, not less than 640, or not less than 650. Further, the above impact strength at low temperature (J/m) is more excellent when the value is higher, and it is not limited to any upper limit. As one example, it is not more than 750, not more than 740, not more than 730, not more than 720, not more than 710, not more than 700, or not more than 690.

Further, preferably, the above copolycarbonate composition has MI (melt index) of 5 to 20 g/10 min as measured in accordance with ASTM D1238 (conditions of 300° C. and 1.2 kg). More preferably, MI (g/10 min) is not less than 6, not less than 7, not less than 8, not less than 9, or not less than 10; and not more than 19, not more than 18, not more than 17, not more than 16, or not more than 15.

The copolycarbonate composition according to the present invention can be used together with the polycarbonate as needed to adjust the physical properties of the copolycarbonate. The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 5:

[Chemical Formula 5]

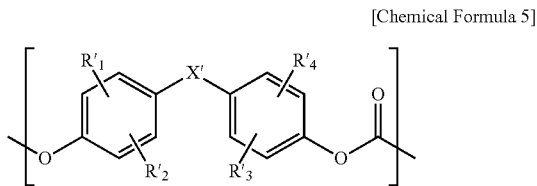

in the Chemical Formula 5, $R'_1$, $R'_2$, $R'_3$ and $R'_4$ are each independently hydrogen, $C_{1-10}$ alkyl, $C_{1-10}$ alkoxy, or halogen, X' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight (g/mol) is not more than 34,000, not more than 33,000, or not more than 32,000.

The repeating unit represented by Chemical Formula 5 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R'_4$ and X' in Chemical Formula 5 are the same as previously described for $R_1$, $R_2$, $R_3$, $R_4$ and X in Chemical Formula 1, respectively.

Further, preferably, the repeating unit represented by Chemical Formula 5 is represented by the following Chemical Formula 5-1:

[Chemical Formula 5-1]

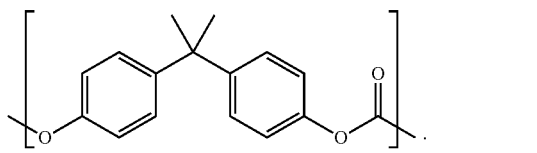

In the copolycarbonate composition, the weight ratio of the copolycarbonate and the polycarbonate is preferably from 99:1 to 1:99, more preferably from 90:10 to 50:50, and most preferably from 20:80 to 80:20.

Article Comprising the Copolycarbonate Composition

In addition, the present invention provides an article comprising the above-mentioned copolycarbonate composition.

Preferably, the above article is an injection molded article.

In addition, the article may further comprise, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may comprise the steps of mixing the copolycarbonate composition according to the present invention and additives such as antioxidants using a mixer, extrusion-molding the mixture with an extruder to produce a pellet, drying the pellet and then injecting the dried pellet with an injection molding machine.

As described above, since the copolycarbonate composition according to the present invention has excellent weather resistance, the article prepared by using this composition exhibits less deteriorated surface quality and physical properties caused by ultraviolet rays or the like when being exposed to the outside.

Advantageous Effects

As set forth above, since the copolycarbonate composition according to the present invention has excellent weather resistance, the article prepared by using this composition exhibits less deteriorated surface quality and physical properties caused by ultraviolet rays or the like when being exposed to the outside.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: AP-34

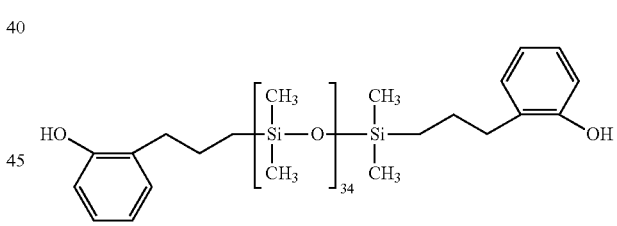

47.60 g (160 mmol) of octamethylcyclotetrasiloxane and 2.40 g (17.8 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 34 when confirmed through $^1$H NMR.

To the resulting terminal-unmodified polyorganosiloxane, 4.81 g (35.9 mmol) of 2-allylphenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'AP-34'. AP-34 was pale yellow oil and the repeating unit (n) was 34 when confirmed through ¹H NMR using a Varian 500 MHz, and further purification was not required.

Preparation Example 2: MB-58

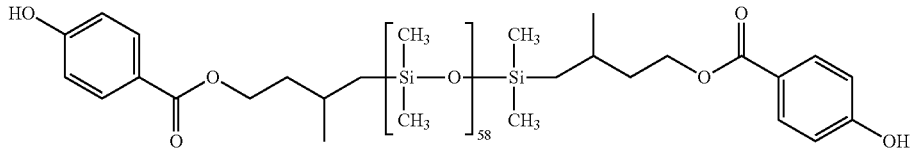

47.60 g (160 mmol) of octamethylcyclotetrasiloxane and 1.5 g (11 mmol) of tetramethyldisiloxane were mixed. The mixture was then introduced in 3 L flask together with 1 part by weight of an acid clay (DC-A3), relative to 100 parts by weight of octamethylcyclotetrasiloxane, and reacted at 60 CC for 4 hours. After completion of the reaction, the reaction product was diluted with ethyl acetate and quickly filtered using a celite. The repeating unit (m) of the terminal-unmodified polyorganosiloxane thus prepared was 58 when confirmed through ¹H NMR.

To the resulting terminal-unmodified polyorganosiloxane, 6.13 g (29.7 mmol) of 3-methylbut-3-enyl 4-hydroxybenzoate and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'MB-58'. MB-58 was pale yellow oil and the repeating unit (m) was 58 when confirmed through ¹H NMR using a Varian 500 MHz, and further purification was not required.

Preparation Example 3: EU-50

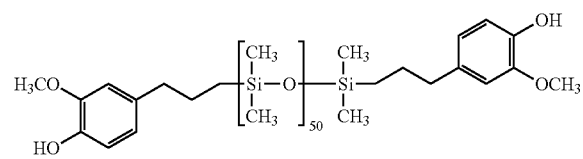

47.60 g (160 mmol) of octamethylcyclotetrasiloxane and 1.7 g (13 mmol) of tetramethyldisiloxane were mixed. The mixture was then placed in 3 L flask together with 1 part by weight of an acid clay (DC-A3), relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (n) of the terminal-unmodified polyorganosiloxane thus prepared was 50 when confirmed through ¹H NMR.

To the resulting terminal-unmodified polyorganosiloxane, 6.13 g (29.7 mmol) of Eugenol and 0.01 g (50 ppm) of Karstedt's platinum catalyst were added and reacted at 90° C. for 3 hours. After completion of the reaction, the unreacted siloxane was removed by conducting evaporation under the conditions of 120° C. and 1 torr. The terminal-modified polyorganosiloxane thus prepared was designated as 'EU-50'. EU-50 was pale yellow oil and the repeating unit (n) was 50 when confirmed through ¹H NMR using a Varian 500 MHz, and further purification was not required.

Preparation Example 4: Preparation of Polycarbonate (PC)

1784 g of water, 385 g of NaOH and 232 g of BPA (bisphenol A) were added to a polymerization reactor, and dissolved with mixing under a N₂ atmosphere. 4.3 g of PTBP (para-tert butylphenol) and 128 g of TPG (triphosgene) were dissolved in MC (methylene chloride) and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and then pH of a produced polymer was adjusted to neutral pH of 6 to 7 by washing three times with distilled water. The polymer thus obtained was re-precipitated in a mixed solution of methanol and hexane, and then dried at 120° C. to give a final polycarbonate. The polycarbonate thus prepared was designated as 'PC'.

Example 1

(Step 1)

1784 g of water, 385 g of NaOH and 232 g of BPA (bisphenol A) were added to a polymerization reactor, and dissolved with mixing under a N₂ atmosphere. 4.3 g of PTBP (para-tert butylphenol) and the mixture (weight ratio: 90:10) of 5.91 g of AP-34 prepared in Preparation Example 1 and 0.66 g of MB-58 prepared in Preparation Example 2 were dissolved in MC (methylene chloride) and then added thereto. Subsequently, 128 g of TPG (triphosgene) was dissolved in MC and a dissolved TPG solution was added thereto and reacted for 1 hour while maintaining pH of the TPG solution at 11 or more. After 10 minutes, 46 g of TEA (triethylamine) was added thereto to conduct a coupling reaction. After a total reaction time of 1 hour and 20 minutes, pH was lowered to 4 to remove TEA, and then pH of a produced polymer was adjusted to neutral pH of 6 to 7 by washing three times with distilled water. The polymer thus obtained was re-precipitated in a mixed solution of methanol and hexane, and then dried at 120° C. to give a final copolycarbonate.

(Step 2)

Based on 100 parts by weight of the copolycarbonate prepared in Step 1, 0.3 part by weight of Tinuvin® 329 as a UV stabilizer was mixed to prepare the desired copolycarbonate composition.

Example 2

80 parts by weight of the copolycarbonate prepared in Step 1 of Example 1, 20 parts by weight of the polycarbonate (PC) prepared in Preparation Example 4 and 0.3 part by weight of Tinuvin® 329 as a UV stabilizer were mixed to prepare the desired copolycarbonate composition.

Example 3

100 parts by weight of the copolycarbonate prepared in Step 1 of Example 1 and 0.2 part by weight of Tinuvin® 329 as a UV stabilizer were mixed to prepare the desired copolycarbonate composition.

Comparative Example 1

The copolycarbonate prepared in Step 1 of Example 1 was referred to as Comparative Example 1.

Comparative Example 2

The copolycarbonate was prepared in the same manner as in Step 1 of Example 1, except that 6.57 g of polyorganosiloxane (100 wt % of polyorganosiloxane (EU-50) of Preparation Example 3) was used. The copolycarbonate was referred to as Comparative Example 2.

Comparative Example 3

Based on 100 parts by weight of the copolycarbonate prepared in Comparative Example 2, 0.3 part by weight of Tinuvin®329 as a UV stabilizer was mixed to prepare the desired copolycarbonate composition. This composition was referred to as Comparative Example 3.

Comparative Example 4

The polycarbonate (PC) prepared in Preparation Example 4 was referred to as Comparative Example 4.

The content of the main components used in the examples and comparative examples are shown in Table 1 below.

Experimental Example

To the respective copolycarbonate composition prepared in the Examples and Comparative Examples, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added thereto, and the resulting mixture was pelletized using a ⌀30 mm twin-screw extruder provided with a vent, and was injection-molded at a cylinder temperature of 300° C. and a mold temperature of 80° C. using an injection molding machine N-20C (manufactured by JSW, Ltd.) to prepare a molded specimen.

The characteristics of the above specimens were determined by the following method and the results were shown in Table 2 below.

1) Weight average molecular weight (g/mol): measured using PC standard with Agilent 1200 series.

2) Impact strength at room temperature and impact strength at low temperature: measured at 23° C. and −30° C. in accordance with ASTM D256 (⅛ inch, Notched Izod).

3) Melt index (MI, g/10 min): measured in accordance with ASTM D1238 (conditions of 300° C. and 1.2 kg).

4) Weather resistance ($\Delta$YI): After injection-molding the specimen (width/length/thickness=60 mm/40 mm/3 mm) at 300° C., YI (Yellow Index) was measured using Color-Eye 7000A (manufactured by X-Rite Ltd.) in accordance with ASTM D1925. Then, after residing the specimen in QUV-A Accelerated Weathering Test chamber (manufactured by Q-LAB Corporation, temperature: 60° C., UV wavelength: 340 nm, light quantity: 0.55 w/m$^2$) for 500 hours) in accordance with ASTM D4329, YI (Yellow Index, 500 hours) was measured using Color-Eye 7000A (manufactured by X-Rite Ltd.) in accordance with ASTM D1925. The difference between YI (500 hours) and YI (0 hour) was calculated. Meanwhile, the measurement conditions of YI (Yellow Index) are as follows:

Measurement temperature: room temperature (23° C.)

Aperture size: Large area of view

Measurement method: transmittance was measured in a spectral range (360 nm to 750 nm).

TABLE 1

|  | Ex.1 | Ex.2 | Ex.3 | C.Ex.1 | C.Ex.2 | C.Ex.3 | C.Ex.4 |
|---|---|---|---|---|---|---|---|
| AP-34 | 5.91 g | Example 1 and Preparation example 4[2)] | Example 1[3)] | 5.91 g | — | — | — |
| MB-58 | 0.66 g | | | 0.66 g | — | — | — |
| Eu-50 | — | | | — | 6.57 g | 6.57 g | — |
| BPA | 232 g | | | 232 g | 232 g | 232 g | 232 g |
| TPG | 128 g | | | 128 g | 128 g | 128 g | 128 g |
| PTBP | 4.3 g | | | 4.3 g | 4.3 g | 4.3 g | 4.3 g |
| UV stabilizer[1)] (part by weight) | 0.3 | 0.3 | 0.2 | — | — | 0.3 | — |

[1)]Tinuvin ® 329, the content relative to 100 parts by weight of copolycarbonate
[2)]80 parts by weight of copolycarbonate prepared in Step 1 of Example 1, and 20 parts by weight of polycarbonate prepared in Preparation Example 4
[3)]100 parts by weight of copolycarbonate prepared in Steo 2 if Example 1

TABLE 2

|  | Unit | Ex.1 | Ex.2 | Ex.3 | C.Ex.1 | C.Ex.2 | C.Ex.3 | C.Ex.4 |
|---|---|---|---|---|---|---|---|---|
| Weight average molecular weight | g/mol | 29400 | 28600 | 29100 | 29500 | 30300 | 30100 | 28700 |
| Impact strength at room temperature | J/m | 781 | 776 | 779 | 823 | 748 | 699 | 850 |
| Impact strength at low-temperature | J/m | 669 | 653 | 661 | 711 | 636 | 591 | 110 |
| Melt Index | g/10 min | 12 | 14 | 13 | 11 | 10 | 11 | 14 |
| Weather resistance | — | 3.2 | 2.9 | 3.4 | 20.3 | 25.4 | 7.6 | 18.9 |

As shown in Table 2 above, it could be confirmed that examples according to the present invention exhibited significantly excellent weather resistance as compared with comparative examples. In particular, it could be confirmed that the examples according to the present invention have remarkably excellent effects of improving weather resistance, compared with comparative Examples in which the UV stabilizer was not included. In addition, it could be confirmed that, the examples according to the present invention had significantly excellent weather resistance, compared with Comparative Example 3 in which UV stabilizer was included but different copolycarbonate was used.

The invention claimed is:

1. A copolycarbonate composition comprising:
   (a) a copolycarbonate comprising an aromatic polycarbonate-based first repeating unit; and one or more aromatic polycarbonate-based second repeating units having siloxane bonds, and
   (b) a UV stabilizer,
   wherein the copolycarbonate composition has ΔYI of not more than 7 as measured according to the following Equation 1:

ΔYI=YI(500 hours)−YI(0 hour)　　[Equation 1]

in the Equation 1,
   YI (0 hour) is YI (Yellow Index) measured in accordance with ASTM D1925 with respect to the copolycarbonate composition, and
   YI (500 hours) is YI (Yellow Index) measured in accordance with ASTM D1925 with respect to the copolycarbonate composition, after irradiating ultraviolet rays of 340 nm to the composition with a light quantity of 0.55 w/m² at 60° C. for 500 hours in accordance with ASTM D4329,
   wherein the second repeating unit comprises a repeating unit represented by Chemical Formula 2 and a repeating unit represented by Chemical Formula 3:

[Chemical Formula 2]

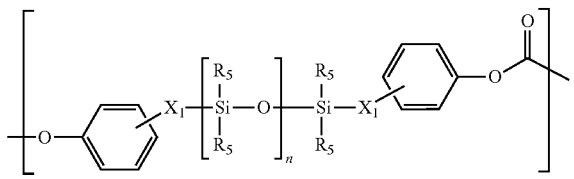

in Chemical Formula 2,
   each of $X_1$ is independently $C_{1-10}$ alkylene,
   each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
   n is an integer of 10 to 200,

[Chemical Formula 3]

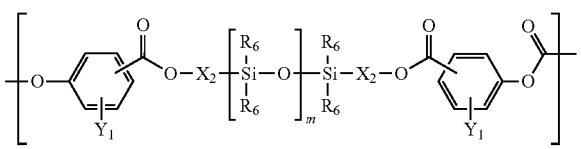

in Chemical Formula 3,
   each of $X_2$ is independently $C_{1-10}$ alkylene,
   each of $Y_1$ is independently hydrogen, $C_{1-6}$ alkyl, halogen, hydroxy, alkoxy, or $C_{6-20}$ aryl,
   each of $R_6$ is independently $C_{1-15}$ alkyl substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
   m is an integer of 10 to 200, and
   wherein the UV stabilizer is represented by Chemical Formula 4:

[Chemical Formula 4]

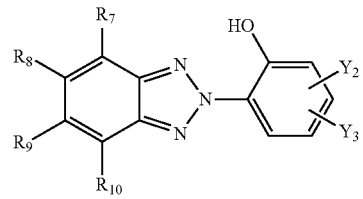

in Chemical Formula 4,
   $R_7$, $R_8$, $R_9$ and $R_{10}$ are each independently hydrogen, hydroxy, halogen, or hydrocarbon group having 1 to 12 carbon atoms, and
   $Y_2$ and $Y_3$ are each independently hydrogen; hydrocarbon group having 1 to 40 carbon atoms, wherein the hydrocarbon group may further comprise a nitrogen atom or an oxygen atom.

2. The copolycarbonate composition of claim 1, wherein ΔYI is not more than 3.5.

3. The copolycarbonate composition of claim 1, wherein the copolycarbonate has a weight average molecular weight of 1,000 to 100,000 g/mol.

4. The copolycarbonate composition of claim 1, wherein the copolycarbonate composition further comprises a polycarbonate.

5. The copolycarbonate composition of claim 4, wherein a polysiloxane structure is not introduced in a main chain of the polycarbonate.

6. The copolycarbonate composition of claim 4, wherein the polycarbonate comprises a repeating unit represented by the following Chemical Formula 5:

[Chemical Formula 5]

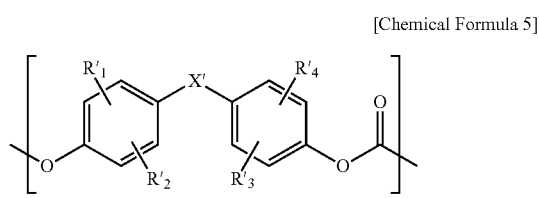

in the Chemical Formula 5, $R'_1$, $R'_2$, $R'_3$ and $R'_4$ are each independently hydrogen, $C_{1-10}$ alkyl, $C_{1-10}$ alkoxy, or halogen, X' is $C_{1-10}$ alkylene unsubstituted or substituted with phenyl, $C_{3-15}$ cycloalkylene unsubstituted or substituted with $C_{1-10}$ alkyl, O, S, SO, $SO_2$ or CO.

7. The copolycarbonate composition of claim 1, wherein the first repeating unit is represented by the following Chemical Formula 1:

[Chemical Formula 1]

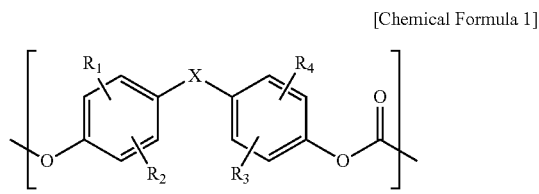

in the Chemical Formula 1, $R_1$, $R_2$, $R_3$ and $R_4$ are each independently hydrogen, $C_{1-10}$ alkyl, $C_{1-10}$ alkoxy, or halogen, and X is alkylene unsubstituted or substituted with phenyl, cycloalkylene unsubstituted or substituted with $C_{1-10}$ alkyl, O, S, SO, $SO_2$, or CO.

8. The copolycarbonate composition of claim 7, wherein the repeating unit represented by the Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, and 1,1-bis(4-hydroxyphenyl)-1-phenylethane, bis(4-hydroxyphenyl)diphenylmethane.

9. The copolycarbonate composition of claim 7, wherein the repeating unit represented by Chemical Formula 1 is represented by the following Chemical Formula 1-1:

[Chemical Formula 1-1]

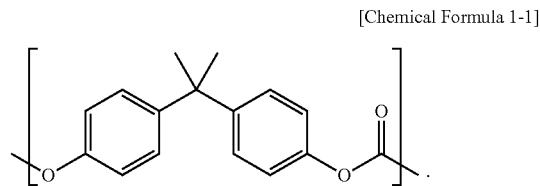

10. The copolycarbonate composition of claim 1, wherein a weight ratio of the repeating unit represented by Chemical Formula 2 and the repeating unit represented by Chemical Formula 3 is 1:99 to 99:1.

11. The polycarbonate composition of claim 1, wherein the repeating unit represented by Chemical Formula 2 is represented by the following Chemical Formula 2-2:

[Chemical Formula 2-2]

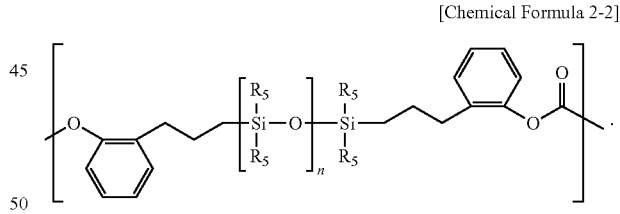

12. The polycarbonate composition of claim 1, wherein the repeating unit represented by Chemical Formula 3 is represented by the following Chemical Formula 3-2:

[Chemical Formula 3-2]

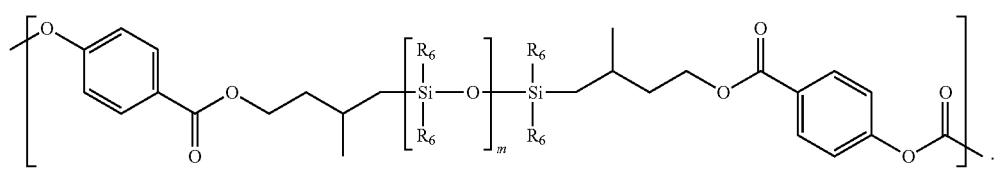

* * * * *